US012581344B2

(12) United States Patent
Silverman et al.

(10) Patent No.: US 12,581,344 B2
(45) Date of Patent: Mar. 17, 2026

(54) MULTIPLE ACCESS POINT WiFi SOUNDING

(71) Applicant: Cisco Technology, Inc., San Jose, CA (US)

(72) Inventors: Matthew A. Silverman, Shaker Heights, OH (US); John M. Swartz, Lithia, FL (US); Malcolm M. Smith, Richardson, TX (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 392 days.

(21) Appl. No.: 18/194,614

(22) Filed: Mar. 31, 2023

(65) Prior Publication Data
US 2024/0334225 A1    Oct. 3, 2024

(51) Int. Cl.
*H04W 24/10*    (2009.01)
*H04B 7/0456*    (2017.01)
*H04L 5/00*    (2006.01)
*H04W 48/16*    (2009.01)

(52) U.S. Cl.
CPC .......... *H04W 24/10* (2013.01); *H04B 7/0456* (2013.01); *H04L 5/005* (2013.01); *H04W 48/16* (2013.01)

(58) Field of Classification Search
CPC .... H04W 24/10; H04W 48/16; H04B 7/0456; H04B 7/024; H04L 5/005; H04L 5/0023; H04L 5/0094; H04L 5/0035; H04L 5/0048
See application file for complete search history.

(56) References Cited

U.S. PATENT DOCUMENTS

| | | | | |
|---|---|---|---|---|
| 9,793,965 B1 * | 10/2017 | Pustovalov | .......... | H04B 7/0452 |
| 11,108,439 B2 * | 8/2021 | Seok | ...................... | H04B 7/024 |
| 2011/0194644 A1 * | 8/2011 | Liu | ................... | H04W 74/0816 |
| | | | | 375/295 |

(Continued)

FOREIGN PATENT DOCUMENTS

| | | | | | |
|---|---|---|---|---|---|
| AU | 2011337463 A1 * | 11/2012 | ............ | H04W 84/12 |
| EP | 3849099 A1 * | 7/2021 | .......... | H04B 7/0626 |

(Continued)

OTHER PUBLICATIONS

International Search Report and Written Opinion for International Application No. PCT/US2024/020461, mailed Jul. 30, 2024, 14 Pages.

*Primary Examiner* — Kevin T Bates
*Assistant Examiner* — Poonam Sharma
(74) *Attorney, Agent, or Firm* — Patterson + Sheridan, LLP

(57) ABSTRACT

Techniques for sounding for wireless communication include initiating staggered sounding between a plurality of wireless access points (APs) and a plurality of wireless stations (STAs), including transmitting, from each AP of the plurality of APs, a sounding trigger to a respective one or more of the plurality of STAs, where the sounding triggers are transmitted by the respective APs at staggered times. The techniques further include receiving sounding matrix data at the plurality of APs from the plurality of STA. The techniques further include modifying wireless transmission between at least one of the APs and at least one of the STAs based on the sounding matrix data.

17 Claims, 5 Drawing Sheets

(56) References Cited

U.S. PATENT DOCUMENTS

| 2016/0029227 A1* | 1/2016 | Aboul-Magd | ......... | H04B 7/024 |
| | | | | 370/329 |
| 2016/0088637 A1* | 3/2016 | Suh | .................... | H04W 72/542 |
| | | | | 370/329 |
| 2016/0295581 A1 | 10/2016 | Ghosh et al. | | |
| 2021/0014906 A1 | 1/2021 | Wang et al. | | |
| 2022/0038241 A1* | 2/2022 | Vermani | ............... | H04L 5/0044 |
| 2022/0224383 A1 | 7/2022 | Suh et al. | | |
| 2023/0012708 A1* | 1/2023 | Dong | .................... | H04B 7/024 |

FOREIGN PATENT DOCUMENTS

| WO | 2022226298 A1 | 10/2022 | | |
| WO | WO-2024191544 A1 * | 9/2024 | ........ | H04W 56/0045 |

* cited by examiner

300 ⌐

| |
|---|
| Start |
| 302 — Initiate staggered sounding |
| 304 — Receive sounding matrix data |
| 306 — Use sounding matrix data to improve transmission |
| End |

302 ⌐

| |
|---|
| Start |
| 402 — Identify coordinator AP |
| 404 — Identify multi-AP sounding schedule |
| 406 — Coordinator AP transmits schedule to secondary APs |
| 408 — Secondary APs receive transmission schedule |
| 410 — APs transmit staggered sounding triggers |
| End |

302

302

500

600

MULTIPLE ACCESS POINT WiFi SOUNDING

TECHNICAL FIELD

Embodiments presented in this disclosure generally relate to wireless communication. More specifically, embodiments disclosed herein relate to sounding for wireless communication.

BACKGROUND

Sounding is used for a variety of purposes in modern WiFi systems. For example, sounding can be used to facilitate beamforming between combinations of wireless access points (APs) and wireless stations (STAs). But sounding takes significant airtime, particularly for deployments with multiple APs and associated STAs. In existing systems sounding is handled using null data packets (NDPs). For example, an NDP announcement (NDPA) frame can be used with an NDP (e.g., an NDP sounding trigger), and with feedback groups. But this can take significant time to execute, hampering network efficiency when sounding has to be performed regularly. This can be exacerbated by beamforming across many combinations of APs and STAs (e.g., in a multiple AP configuration).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
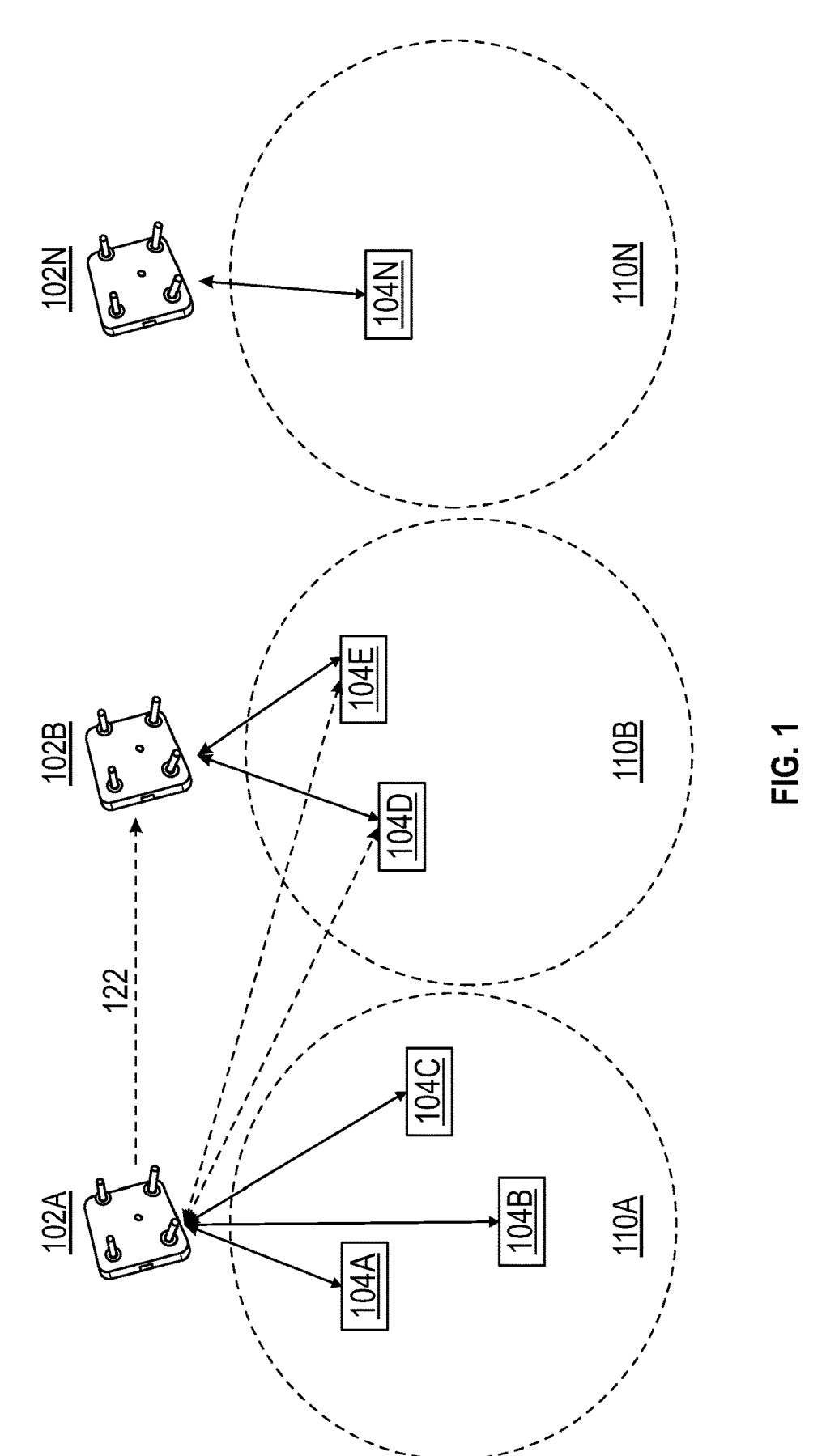
FIG. 1 illustrates sounding for a wireless networking environment with multiple APs, according to one embodiment.

Embodiments include a method. The method includes initiating staggered sounding between a plurality of wireless access points (APs) and a plurality of wireless stations (STAs), including transmitting, from each AP of the plurality of APs, a sounding trigger to a respective one or more of the plurality of STAs, where the sounding triggers are transmitted by the respective APs at staggered times. The method further includes receiving sounding matrix data at the plurality of APs from the plurality of STAs. The method further includes modifying wireless transmission between at least one of the APs and at least one of the STAs based on the sounding matrix data.

Embodiments further include a system, including a processor and a memory having instructions stored thereon which, when executed on the processor, performs operations. The operations include initiating staggered sounding between a plurality of APs and a plurality of STAs, including transmitting, from each AP of the plurality of APs, a sounding trigger to a respective one or more of the plurality of STAs, where the sounding triggers are transmitted by the respective APs at staggered times. The operations further include receiving sounding matrix data at the plurality of APs from the plurality of STAs. The operations further include modifying wireless transmission between at least one of the APs and at least one of the STAs based on the sounding matrix data.

Embodiments further include a non-transitory computer-readable medium having instructions stored thereon which, when executed by a processor, performs operations. The operations include initiating staggered sounding between a plurality of APs and a plurality of STAs, including transmitting, from each AP of the plurality of APs, a sounding trigger to a respective one or more of the plurality of STAs, where the sounding triggers are transmitted by the respective APs at staggered times. The operations further include receiving sounding matrix data at the plurality of APs from the plurality of STAs. The operations further include modifying wireless transmission between at least one of the APs and at least one of the STAs based on the sounding matrix data.

Example Embodiments

As discussed above, sounding is a significant burden for multiple AP deployments. This is particularly true for ultra high reliability (UHR) implementations, where beamforming is used improve a signal to noise ratio (SNR) for communication between APs and STAs, requiring frequent sounding across many combinations of APs and STAs. It is also true for multi-user multiple input multiple output (MU-MIMO) implementations, where some signals are nulled, and others are enhanced, but adjusting signal phase and amplitude using a pre-coder generated by sounding. These are merely examples, and sounding has a wide variety of uses and advantages.

In existing systems, an AP transmits an NDPA to associated STAs to announce that sounding is starting, and then the AP transmits NDPs to STAs to sound available paths. A given AP transmits an NDPA and NDPs to multiple STAs, and multiple STAs respond with sounding matrix data (e.g., compressed sounding matrix (cSM) data) used for sounding.

In an embodiment, one or more techniques disclosed herein can be used to improve sounding efficiency, particularly for multiple AP deployments. For example, a coordinator AP can schedule staggered sounding among multiple APs. This is discussed further, below, with regard to FIGS. 3 and 4A. As another example, multiple APs can broadcast staggered sounding triggers to associated STAs. This is discussed further, below, with regard to FIGS. 3 and 4B. Further, multicast groups can be formed and used to transmit sounding triggers, both within a basic service set (BSS) for the transmitting AP and outside of the BSS for the transmitting AP. This is discussed further, below, with regard to FIGS. 3 and 4C.

For example, a given deployment might implement a coordinator AP solution for a relatively small number of STAs, and a broadcast (or multicast) solution for a larger number of STAs. A coordinator AP solution can allow for on-demand sounding transmission to adjust for network traffic or other network conditions, and may allow for more accurate sounding if sounding across various APs and STAs is triggered close in time. But a broadcast sounding trigger solution can have less overhead, both in terms of network traffic and AP workload. In an embodiment, different solutions can be configured for different deployments or different network conditions.

Further, in an embodiment, suitable identifiers (e.g., association identifiers (AIDs)) can be used by a transmitting AP to trigger sounding for STAs outside of the AP's BSS. This is discussed further, below, with regard to FIG. 5. In addition, for any of the solutions described above, STAs can respond with cSM data in dedicated frames, or by dividing cSM data and including chunks of cSM data in frame padding. This is discussed further, below, with regard to FIG. 6. Transmitting cSM data as frame padding for existing frames can significantly reduce network traffic and improve efficiency, as compared with transmitting cSM data in dedicated frames.

FIG. 1 illustrates sounding for a wireless networking environment 100 with multiple APs, according to one embodiment. In an embodiment, the wireless network environment includes multiple APs 102A-N. Each of these APs 102A-N is associated with one or more STAs 104A-N. The STAs 104A-N can be any suitable wireless devices, including client devices (e.g., laptop computers, desktop computers, smartphones, tablets, wearable devices, Internet of Things (IoT) devices, and any other suitable devices), APs, controllers, or any other suitable wireless devices.

For example, the AP 102A is associated with the STAs 104A-C as part of a BSS 110A. The AP 102B is associated with the STAs 104D-E as part of another BSS 110B. The AP 102N is associated with the STA 104N as part of a BSS 110N. These are merely example, and any suitable wireless networking environment can be used (e.g., any suitable number of APs, STAs, and BSSs).

In an embodiment, one or more of the APs 102A-N and STAs 104A-N support beamforming. Beamforming can be an effective method to extend the transmission range between an AP and an STA. For example, to implement beamforming an AP can transmit its signal from different radio chains at a slightly different time, allowing constructive interference to focus the beam toward a target STA. Beamforming can greatly extend the range of the radio-frequency (RF) signal from the AP to the STA. Further, one or more STAs can use beamforming (e.g., from multiple radio chains at a given STA or from multiple STAs) to enhance transmission from the STAs to a given AP.

In an embodiment, sounding is used to implement beamforming. For example, the AP 102A can transmit a sounding frame (e.g., an NDP or NDPA) to the STAs 104A-N. The STAs can respond by feeding back cSM data. The AP 102A can then use the cSM data to coordinate beamforming to the STAs 104A-N. As discussed above, sounding can also be used for MU-MIMO transmission, or for any other suitable technique.

As discussed above, existing techniques may be suitable for sounding from a single AP to one or more STAs. But they are highly inefficient and not suitable for sounding between multiple APs and multiple STAs. As discussed below in relation to FIGS. 3-6, one more improved techniques can be used for significantly more efficient beamforming sounding across multiple APs and multiple STAs. For example, as discussed below in relation to FIGS. 3 and 4A, a coordinator AP can be used to schedule sounding across multiple APs (e.g., staggered sounding across multiple APs). Further, as discussed below in relation to FIGS. 3 and 4B, APs can use broadcast sounding triggers for sounding by multiple APs, and as discussed in relation to FIGS. 3 and 4C, APs can use multicast transmissions to trigger sounding. Each of these is discussed further, below.

Figure 2:
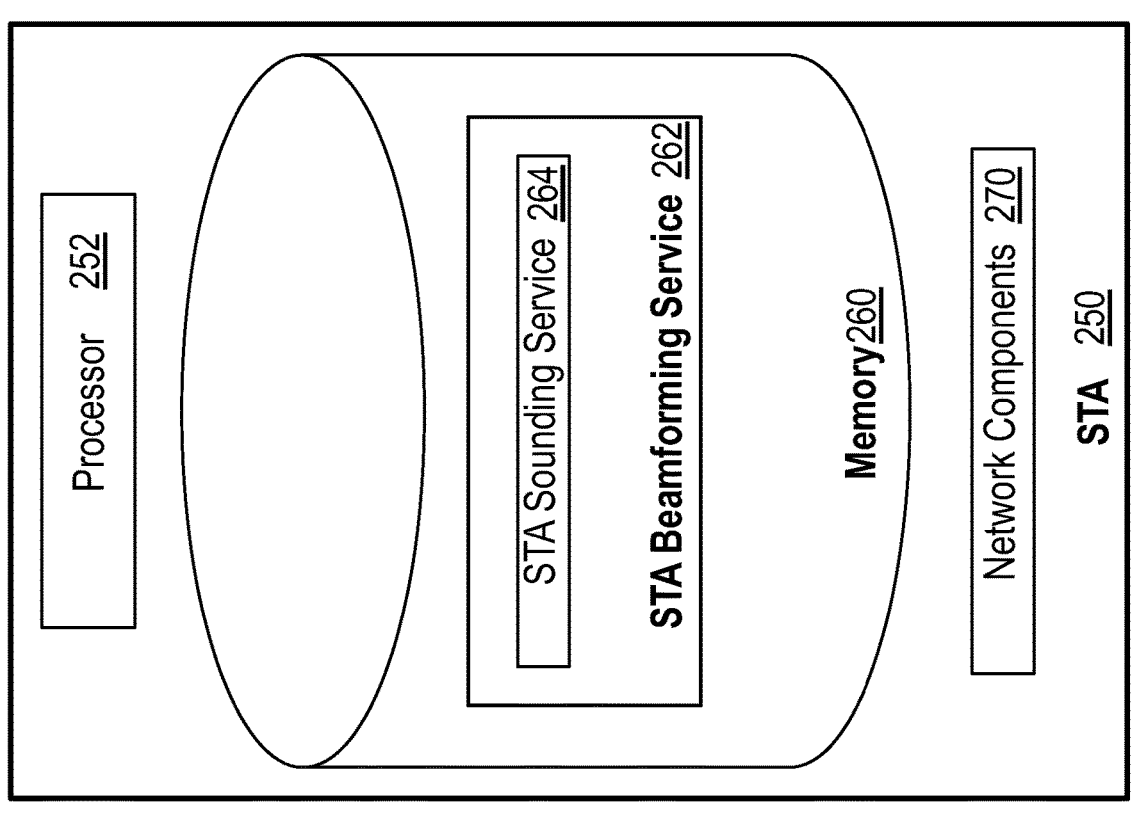
FIG. 2 is a block diagram illustrating an STA and AP for sounding for wireless networking with multiple APs, according to one embodiment.
Figure 2:
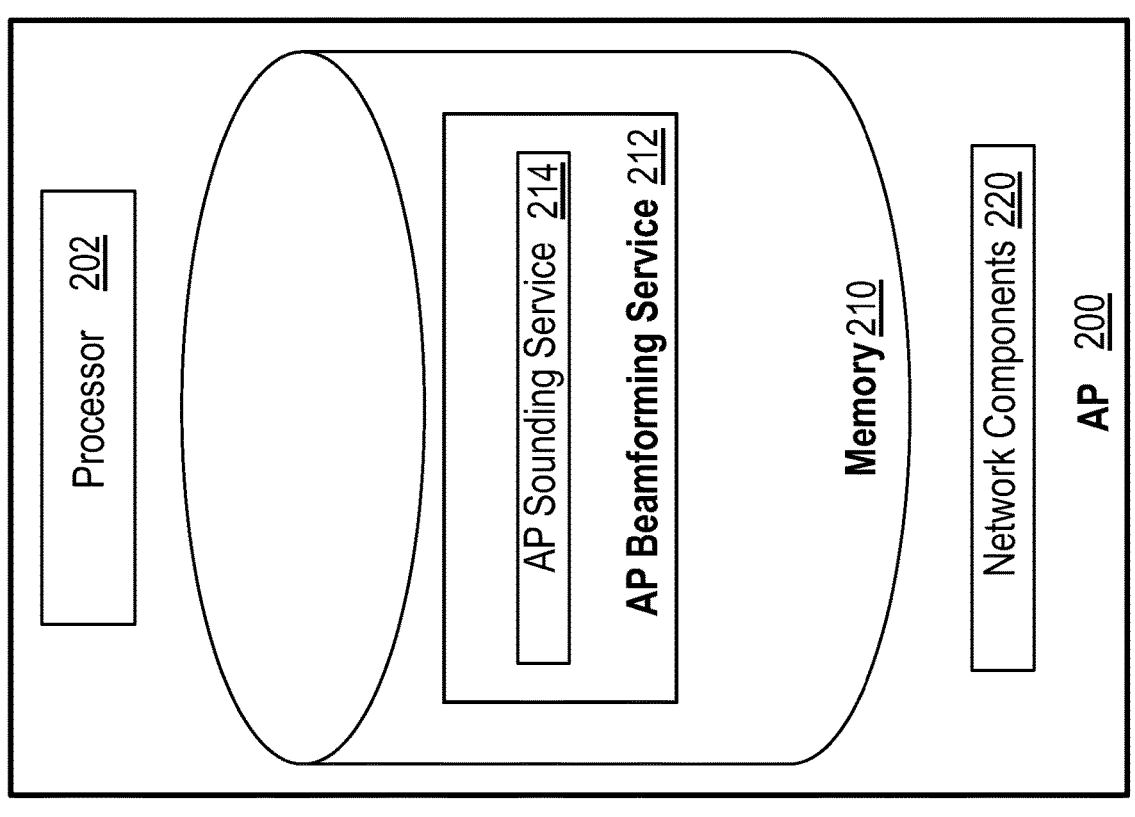

FIG. 2 is a block diagram illustrating an STA and AP for sounding for wireless networking with multiple APs, according to one embodiment. In an embodiment, the AP 200 can correspond with any of the APs 102A-N illustrated in FIG. 1, and the STA 250 can correspond with any of the STAs 104A-N illustrated in FIG. 1.

The AP 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the AP to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the AP 200. The program code is generally described as various functional "applications" or "modules" within the memory 210, although alternate implementations may have different functions and/or combinations of functions. Within the memory 210, the AP beamforming service 212 facilitates AP beamforming and the AP sounding service 214 facilitates sounding. This is discussed further, below, with regard to FIGS. 3-6. Further, using an AP 200 for coordinating STA beamforming is merely one example. Alternatively, or in addition, any other network device (e.g., a wireless local area network (WLAN) controller (WLC) or another network component) can be used.

The STA 250 includes a processor 252, a memory 260, and network components 270. The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the STA 250 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the STA 250. The program code is generally described as various functional "applications" or "modules" within the memory 260, although alternate implementations may have different functions and/or combinations of functions. Within the memory 260, the STA beamforming service 262 facilitates beamforming for the STA 250 and the STA sounding service 264 facilitates sounding for the STA 250. This is discussed further, below, with regard to FIGS. 3-6. Further, using an STA 250 for sounding and beamforming is merely one example. Alternatively, or in addition, any other network device (e.g., the AP 200, a WLC or another network component, or any suitable combination) can be used.

Figure 3:
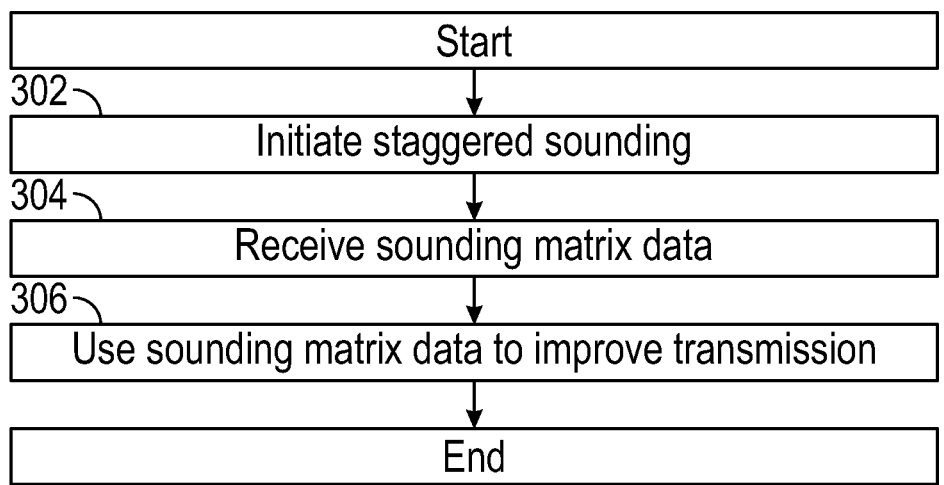
FIG. 3 is a flowchart 300 illustrating sounding for wireless networking with multiple APs, according to one embodiment.

FIG. 3 is a flowchart 300 illustrating sounding for wireless networking with multiple APs, according to one embodiment. At block 302 an AP sounding service (e.g., the AP sounding service 214 illustrated in FIG. 2) initiates staggered sounding. As discussed below, the AP sounding service can initiate sounding in a variety of different ways. For example, the AP sounding service can coordinate sounding by multiple APs. The AP sounding service can operate at a coordinator AP, and can identify an order that other APs should initiate sounding. This is discussed further, below, with regard to FIG. 4A.

As another example, the AP sounding service at multiple APs can broadcast sounding triggers to STAs. For example, an AP sounding service can transmit a UHR sounding physical layer protocol data unit (PPDU) to STAs. These PPDUs can be transmitted at suitable intervals over a given transmit opportunity (TxOP) duration. This is discussed further, below, with regard to FIG. 4B.

As another example, the AP sounding service can use UHR multicast (MCAST) sounding. The AP sounding service can form MCAST groups using knowledge of broadcast target wake time (TWT) membership or stream classification service (SCS) scheduling. This is discussed further, below, with regard to FIG. 4C.

At block 304, the AP sounding service receives sounding matrix data. For example, the AP sounding service can receive cSM data from STAs in response to initiating sounding at block 302. In an embodiment, the STAs transmit sounding matrix data using dedicated frames. Alternatively, or in addition, the STAs transmit sounding matrix data as part of post end-of-frame (EOF) padding. This is discussed further, below, with regard to FIG. 6.

At block 306, an AP beamforming service (e.g., the AP beamforming service 212 illustrated in FIG. 2) uses sounding matrix data to improve transmissions. For example, the AP beamforming service can use the sounding matrix data received at block 304 to beamform transmissions to STAs that engaged in sounding. As discussed above, beamforming by an AP can significantly improve transmission performance. As another example, an AP can use sounding to improve MU-MIMO transmissions. These are merely examples, and sounding can be used for any suitable technique.

Figure 4A:
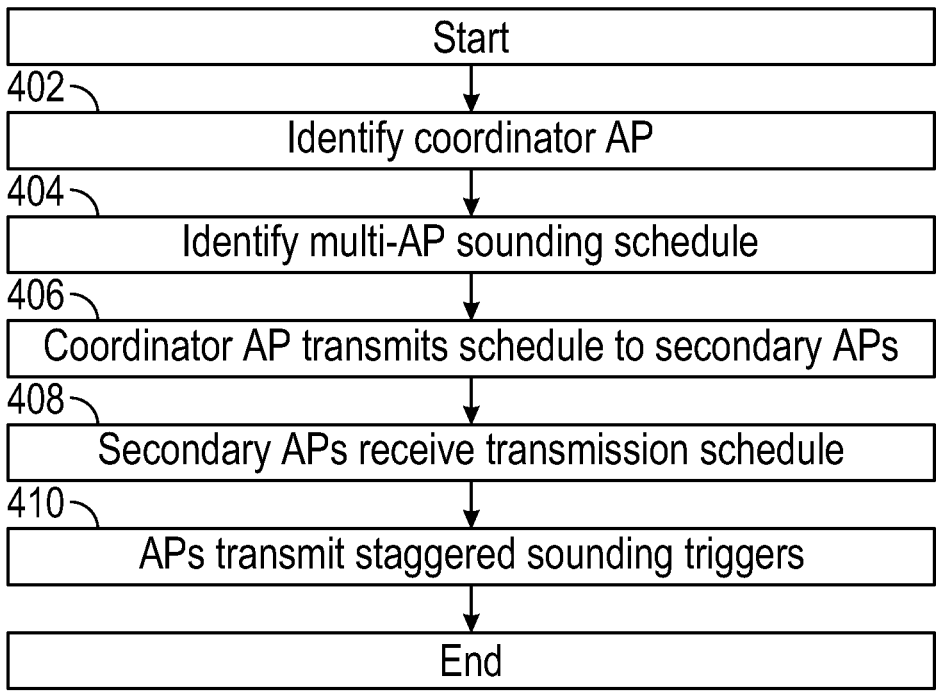
FIGS. 4A-C are flowcharts illustrating initiating sounding, according to one embodiment.

FIG. 4A is a flowchart illustrating coordinating sounding among multiple APs using a coordinator AP, according to one embodiment. In an embodiment, FIG. 4A provides one example of initiating staggered sounding, discussed above in relation to block 302 illustrated in FIG. 3. At block 402, an AP sounding service (e.g., the AP sounding service 214 illustrated in FIG. 2), a controller (e.g., a WLC), or any other suitable entity or service identifies a coordinator AP.

For example, assume a wireless deployment includes multiple APs (e.g., the APs 102A-N illustrated in FIG. 1). In an embodiment, the first AP to take the TxOP is identified as the coordinator AP. As another example, a controller associated with multiple APs (e.g., with the APs 102A-N illustrated in FIG. 1) could identify a coordinator AP. The controller could divide a deployment into clusters and identify a coordinator AP for each cluster, could identify a coordinator AP for the whole deployment, or can use any other suitable technique. As another example, a system administrator could identify a coordinator AP. These are merely examples, and the coordinator AP can be identified using any suitable technique and by any suitable entity.

At block 404, the coordinator AP identifies a multi-AP sounding schedule. In an embodiment, the coordinator AP identifies a schedule for sounding transmission by secondary APs, and itself, so that sounding occurs in a staggered manner. The coordinator AP can determine the schedule itself, can receive the schedule from a controller or another network component, or can determine the schedule using any other suitable technique. In an embodiment, the schedule identifies transmission information for APs to conduct sounding. This transmission information can include an order of transmission, designated transmission times (e.g., transmission after sending or receiving a particular network message), or any other suitable scheduling transmission information.

At block 406, the coordinator AP transmits the schedule to secondary APs. In an embodiment, an AP sounding service at the coordinator AP includes the scheduling information in an NDPA. For example, the NDPA can designate an order of transmission by the secondary APs, can designate a transmission time (e.g., after transmitting or receiving an NDPA, NDP, or another network message), and can include any other suitable information. The coordinator AP transmits the NDPA with the schedule information to secondary APs. For example, as illustrated in FIG. 1, a coordinator AP 102A can transmit an NDP 122 to a secondary AP 102B.

At block 408, the secondary APs receive the transmission schedule. For example, the secondary APs can receive an NDPA from the coordinator AP. The secondary APs can parse the NDPA to identify the sounding scheduling information.

At block 410, the APs transmit staggered sounding triggers. In an embodiment, the secondary APs use the scheduling information received at block 408 to transmit the sounding triggers. For example, the secondary APs can each transmit an NDP to initiate sounding for one or more STAs, based on the schedule. In an embodiment the multiple APs transmit the NDP at staggered times (e.g., so that the respective NDPs are initiated at different times for the different APs and transmission overlaps partially, but not fully, in time).

In an embodiment, an NDPA (or any other suitable sounding trigger) can specify which STAs can feedback sounding matrix data. For example, the triggering AP can use buffer status report data to identify which STAs can feed back. This can be true for the coordinated sounding discussed in relation to FIG. 4A, or any other sounding techniques (e.g., as discussed below in relation to FIGS. 4B-C).

Figure 4B:
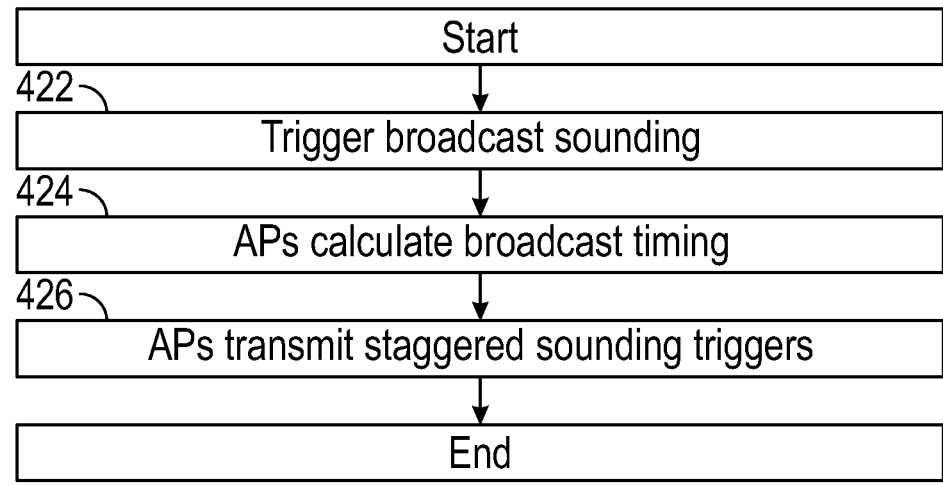

FIG. 4B is a flowchart illustrating broadcasting staggered sounding triggers from multiple APs, according to one embodiment. In an embodiment, FIG. 4B provides another example of initiating staggered sounding, discussed above in relation to block 302 illustrated in FIG. 3. At block 422 an AP sounding service (e.g., the AP sounding service 214 illustrated in FIG. 2), a controller (e.g., a WLC), or any other suitable entity or service triggers broadcast sounding. For example, a controller could trigger associated APs to undertake broadcast sounding. This is merely an example, and any suitable technique can be used by any suitable entity. For example, a system administrator could configure APs to undertake broadcast sounding (e.g., without an additional trigger).

At block 424, the APs calculate broadcast timing. For example, the APs could each transmit a broadcast frame (e.g., a UHR specific broadcast frame) at designated intervals (e.g., 50-100 ms intervals, or any other suitable intervals) to associated STAs. In an embodiment, the APs could coordinate with TWT or SCS timing. This can help ensure that STAs don't miss the broadcast frames and respond appropriately.

At block 426, the APs transmit staggered sounding triggers. For example, the broadcast frames identified at block 424 can serve as sounding triggers for STAs. These broadcast frames can be UHR PPDUs for sounding, or any other suitable sounding triggers. For example, the PPDUs can be regular data PPDUs with an extended training field (e.g., an extended long training field (LTF)) to indicate a sounding trigger. In an embodiment, the various APs transmit the broadcast frames at staggered times (e.g., so that the respective APs each transmit the broadcast frames at different times compared with other APs).

The STAs can listen for the broadcast frames, compute sounding matrix data (e.g., cSM data), and transmit sounding matrix data back to the triggering AP. As discussed below in relation to FIG. 6, in an embodiment the STAs provide sounding matrix data in suitable chunks as padding in other frames. Further, in deployments implementing trigger based transmission (e.g., UHR-TB), a PPDU can indicate that it seeks sounding matrix data from STAs and can piggyback on triggered traffic uplink. Further, a modified buffer status report (BSRP) trigger could collect data in groups (e.g., for multicast trigger, as discussed below in relation to FIG. 4C).

Figure 4C:
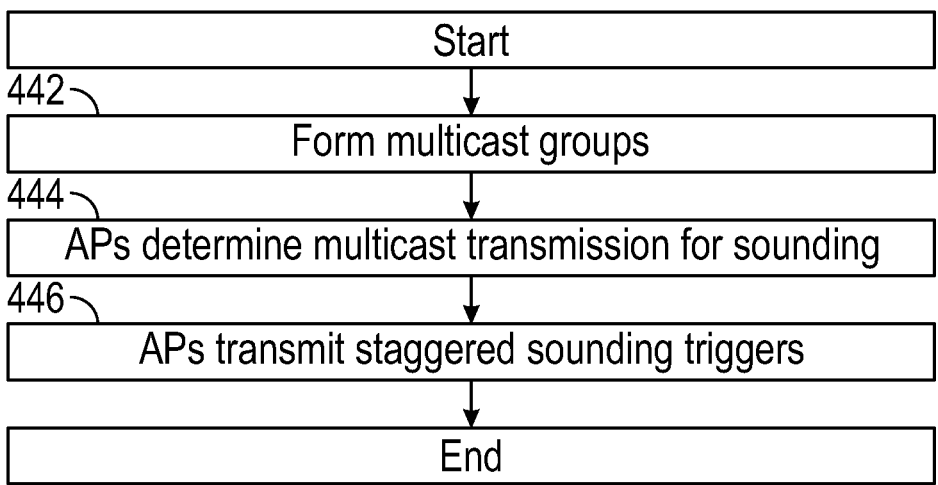

FIG. 4C is a flowchart illustrating multicast sounding for multiple APs, according to one embodiment. In an embodiment, FIG. 4C provides another example of initiating staggered sounding, discussed above in relation to block 302 illustrated in FIG. 3. At block 442 an AP sounding service (e.g., the AP sounding service 214 illustrated in FIG. 2), a controller (e.g., a WLC), or any other suitable entity or service forms multicast groups.

In an embodiment, the multicast groups are formed using knowledge of TWT membership (e.g., identify a TWT during which associated STAs will be aware for transmissions from an AP). Alternatively, or in addition, the multicast groups are formed using knowledge of an SCS schedule (e.g., to identify multiple STAs that can be served in the same uplink orthogonal frequency divisional multiple access (UL-OFDMA) trigger.

At block 444, the APs determine multicast transmission for sounding. In an embodiment, each AP transmits a multicast sounding trigger. For example, each AP can transmit a broadcast frame with a list of AIDs for STAs in that APs BSS. As illustrated in FIG. 1, the AP 102A could transmit a broadcast frame with a list of AIDs for STAs 104A, 104B, and 104C, in the BSS 110A. As another example, each AP can transmit a broadcast frame with a list of AIDs for STAs across multiple different BSSs. As illustrated in FIG. 1, the AP 102A could transmit a broadcast frame with AIDs for the STAs 104A, 104B, and 104C in its BSS 110A, and also AIDs for the STAs 104D and 104E in the BSS 110B associated with a different AP 102B. This is discussed further, below, with regard to FIG. 5. AIDs are merely one example, and any suitable identifier can be used.

At block 446, the APs transmit staggered sounding triggers. For example, the APs can transmit the multicast triggers discussed above in relation to block 444. In an embodiment, the various APs transmit the triggers at staggered times (e.g., so that the respective APs each transmit the triggers at different times compared with other APs).

Figure 5:
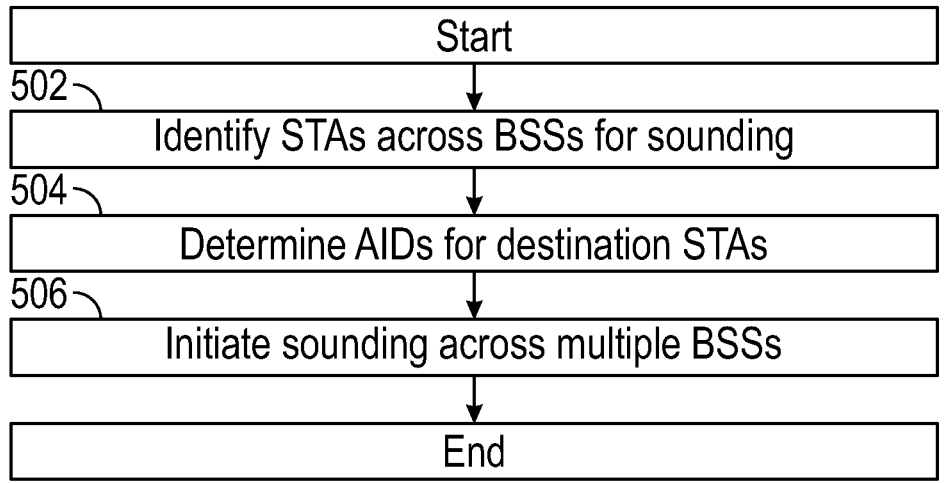
FIG. 5 is a flowchart illustrating sounding across BSSs using association identifiers, according to one embodiment.

FIG. 5 is a flowchart 500 illustrating sounding across BSSs using AIDs, according to one embodiment. At block 502, an AP sounding service (e.g., the AP sounding service 214 illustrated in FIG. 2 identifies STAs across BSSs for sounding. In an embodiment, an AP can initiate sounding for both STAs in its BSS, and STAs in another BSS. For example, as discussed above in relation to FIG. 4C, an AP can initiate multicast sounding across different BSS.

At block 504, the AP sounding service determines AIDs for destination STAs. In an embodiment, the AP sounding service includes AIDs for these destination STAs in a sounding trigger message. For example, the list of AIDs could be included in a broadcast sounding PPDU (e.g., as discussed above in relation to FIGS. 4B-C), or in any other suitable sounding trigger message.

At block 506, the AP sounding service initiates sounding across multiple BSSs. For example, as illustrated in FIG. 1, an AP 102A could transmit a sounding trigger with a list of AIDs for the STAs 104A, 104B, and 104C in its BSS 110A, and also AIDs for the STAs 104D and 104E in the BSS 110B associated with a different AP 102B. This would initiate sounding for all of the STAs 104A-E, to the AP 102A, so that each of these STAs 104A-E would transmit sounding matrix information to the AP 102A (e.g., instead of, or in addition to, transmitting sounding matrix information to the AP with which the respective STA is associated).

Figure 6:
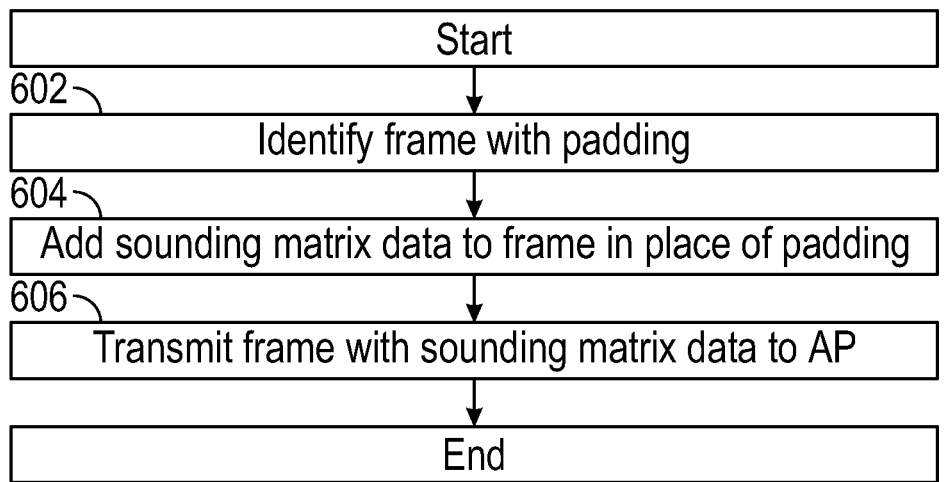
FIG. 6 is a flowchart illustrating transmitting sounding matrix data from an STA, according to one embodiment.

FIG. 6 is a flowchart 600 illustrating transmitting sounding matrix data from an STA, according to one embodiment. As discussed above, in an embodiment each respective STA responds to a sounding trigger message (e.g., an NDP, a broadcast sounding PPDU, or another sounding trigger) with sounding matrix data (e.g., cSM data). The receiving AP then uses the sounding matrix data for beamforming, or any other suitable purpose.

Typically, a given STA transmits sounding matrix data in designated frames (e.g., in response to the sounding trigger message). Alternatively, or in addition, the STA can include sounding matrix data as padding in existing frame transmissions. For example, the STA can include sounding matrix data in post-EOF padding.

At block 602, an STA sounding service (e.g., the STA sounding service 264 illustrated in FIG. 2) identifies a frame with padding. For example, data transmission allocation and scheduling for STAs may result in frames that are transmitted with padding instead of user data (e.g., post-EOF media access control (MAC) protocol data unit (A-MPDU) padding). The STA sounding service can identify one or more of these frames with padding.

At block 604, the STA sounding service adds sounding matrix data to one or more frames instead of padding. For example, post-EOF A-MPDU padding can include four bytes of padding. The STA sounding service can divide sounding matrix data into suitable chunks (e.g., portions), and can add these chunks to the post-EOF A-MPDU frames instead of padding. This is merely an example, and the STA sounding service can add sounding matrix data in place of any suitable frame padding.

At block 606, the STA sounding service transmits one or more frames with sounding matrix data to an AP. As discussed above, these frames can include the sounding matrix data in place of padding. The AP can parse the received frames to reconstruct the sounding matrix data (e.g., for beamforming).

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

initiating staggered sounding between a plurality of wireless access points (APs) and a plurality of wireless stations (STAs), comprising:

transmitting, from each AP of the plurality of APs, a sounding trigger to a respective one or more of the plurality of STAs, wherein the sounding triggers are transmitted by the respective APs at staggered times;

receiving, at each respective AP of the plurality of APs, one or more messages from one or more STAs of the plurality of STAs, wherein the one or more messages include one or more frames having compressed sounding matrix (cSM) data in place of padding for the one or more frames; and modifying wireless transmission between at least one of the APs and at least one of the STAs based on the cSM data.

2. The method of claim 1, wherein initiating staggered sounding further comprises:

coordinating transmission of the sounding triggers between the plurality of APs using one or more network transmissions between the plurality of APs.

3. The method of claim 2, wherein coordinating transmission of the sounding triggers between the plurality of APs using one or more network transmissions between the plurality of APs further comprises:

transmitting, from a coordinator AP to one or more other APs in the plurality of APs, scheduling information for sounding triggers, wherein the one or more other APs use the scheduling information to determine transmission of sounding triggers to STAs.

4. The method of claim 1, wherein initiating staggered sounding further comprises:

broadcasting sounding trigger messages from each of the plurality of APs to one or more respective STAs.

5. The method of claim 1, wherein initiating staggered sounding further comprises:

forming one or more multicast groups for the plurality of APs; and transmitting multicast sounding trigger messages using the one or more multicast groups.

6. The method of claim 5, wherein the one or more multicast groups are formed based on at least one of: (i) target wake time (TWT) membership or (ii) stream classification service (SCS) scheduling.

7. The method of claim 1, wherein a first AP, of the plurality of APs, transmits a sounding trigger to a first STA outside of a basic service set (BSS) for the first AP.

8. The method of claim 7, wherein the first AP transmits the sounding trigger to the first STA based on including an association identifiers (AIDs) for the first STA in the sounding trigger.

9. The method of claim 1, wherein the padding comprises post end of frame (post-EOF) media access control (MAC) protocol data unit (A-MPDU) padding.

10. The method of claim 1, wherein the sounding triggers are by the respective APs at staggered times such that the transmission of the sounding triggers from the plurality of APs overlaps partially, but not fully, in time.

11. A system, comprising:

a processor; and a memory having instructions stored thereon which, when executed on the processor, performs operations comprising:

initiating staggered sounding between a plurality of wireless access points (APs) and a plurality of wireless stations (STAs), comprising:

transmitting, from each AP of the plurality of APs, a sounding trigger to a respective one or more of the plurality of STAs, wherein the sounding triggers are transmitted by the respective APs at staggered times;

receiving, at each respective AP of the plurality of APs, one or more messages from one or more STAs of the plurality of STAs, wherein the one or more messages include one or more frames having compressed sounding matrix (cSM) data in place of padding for the one or more frames; and modifying wireless transmission between at least one of the APs and at least one of the STAs based on the cSM data.

12. The system of claim 11, wherein initiating staggered sounding further comprises:

coordinating transmission of the sounding triggers between the plurality of APs using one or more network transmissions between the plurality of APs.

13. The system of claim 12, wherein coordinating transmission of the sounding triggers between the plurality of APs using one or more network transmissions between the plurality of APs further comprises:

transmitting, from a coordinator AP to one or more other APs in the plurality of APs, scheduling information for sounding triggers, wherein the one or more other APs use the scheduling information to determine transmission of sounding triggers to STAs.

14. The system of claim 11, wherein initiating staggered sounding further comprises at least one of: (i) broadcasting sounding trigger messages from each of the plurality of APs to one or more respective STAs or (ii) transmitting multicast sounding trigger messages using one or more multicast groups.

15. A non-transitory computer-readable medium having instructions stored thereon which, when executed by a processor, performs operations comprising:

initiating staggered sounding between a plurality of wireless access points (APs) and a plurality of wireless stations (STAs), comprising:

transmitting, from each AP of the plurality of APs, a sounding trigger to a respective one or more of the plurality of STAs, wherein the sounding triggers are transmitted by the respective APs at staggered times;

receiving, at each respective AP of the plurality of APs, one or more messages from one or more STAs of the plurality of STAs, wherein the one or more messages include one or more frames having compressed sounding matrix (cSM) data in place of padding for the one or more frames; and modifying wireless transmission between at least one of the APs and at least one of the STAs based on the cSM data.

16. The non-transitory computer-readable medium of claim 15, wherein initiating staggered sounding further comprises:

coordinating transmission of the sounding triggers between the plurality of APs using one or more network transmissions between the plurality of APs.

17. The non-transitory computer-readable medium of claim 15, wherein initiating staggered sounding further comprises at least one of: (i) broadcasting sounding trigger messages from each of the plurality of APs to one or more respective STAs or (ii) transmitting multicast sounding trigger messages using one or more multicast groups.

* * * * *